March 15, 1932. J. H. JOHNSTON 1,849,301
REVERSE MOVEMENT LOCKING DEVICE FOR AUTOMOBILES
Filed April 15, 1930

Inventor
Joshua H. Johnston
By E. Vatton Bruington
Attorney

Patented Mar. 15, 1932

1,849,301

UNITED STATES PATENT OFFICE

JOSHUA H. JOHNSTON, OF BALTIMORE, MARYLAND

REVERSE MOVEMENT LOCKING DEVICE FOR AUTOMOBILES

Application filed April 15, 1930. Serial No. 444,390.

This invention relates to automobiles and has special reference to a device for positively preventing the driving wheels of an automobile from running backwardly except when backward movement of the machine is intentionally desired.

One important object of the invention is to provide a novel and efficient means for positively stopping backward rotation of the automobile tail shaft excepting when the gear shift is arranged for backward movement of the car.

A second important object of the invention is to provide a ratchet wheel on the tail shaft and a pawl adjacent thereto which will engage the ratchet upon rotation of the shaft in a backward direction and thereby stop backward movement of said shaft.

A third important object of the invention is to provide means which, upon movement of the gear shift to reverse position, will act to disengage said pawl from the ratchet and hold it in disengaged position.

A fourth important object of the invention is to provide means whereby, during normal forward running of the automobile, the pawl will be held free from said ratchet.

With the above and other objects in view, the invention consists in general of certain novel details of construction and combinations of parts hereinafter more fully described, illustrated in the accompanying drawings and specifically claimed.

In the accompanying drawings like characters of reference indicate like parts in the several views, and:

In the embodiment of the invention as here disclosed there is shown a fixed part of the automobile 10 which may be taken to illustrate an end of the gear case. Through this part extends the main gear shift shaft or tail shaft 11 which, as is well known, revolves in one direction or the other in accordance with the change gearing positions, the forward movement being shown in Figure 2 and the rearward movement in Figure 1 by the arrows. The usual slidable reverse rod 12 is also shown, this rod in its rearward position effecting engagement of the change gears to drive the shaft 11 in its direction for rearward movement of the vehicle.

Figure 1:
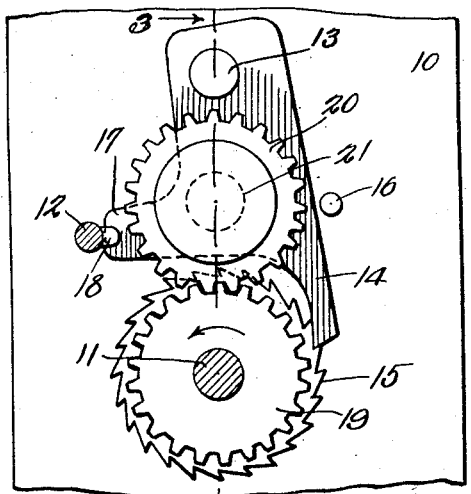
Figure 1 is a section through the tail shaft and reverse rod showing the invention applied thereto with the parts in one position.
Figure 2:
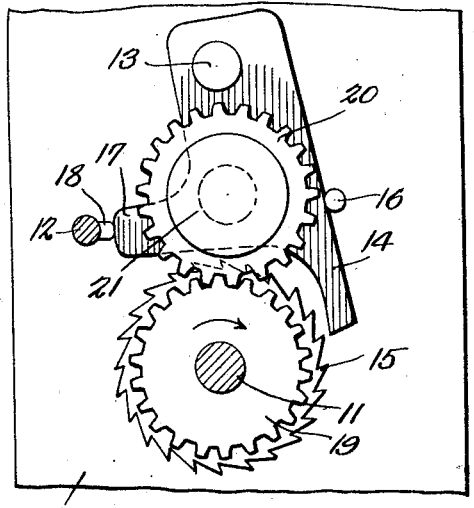
Figure 2 is a similar view with the parts in a second position.
Figure 3:
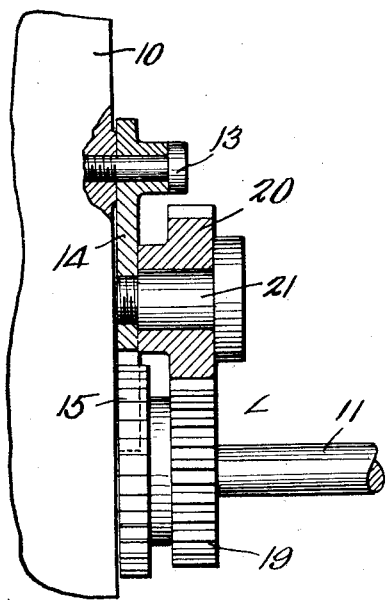
Figure 3 is a view partly in elevation and partly in section on the line 3—3 of Figure 1.
Figure 4:
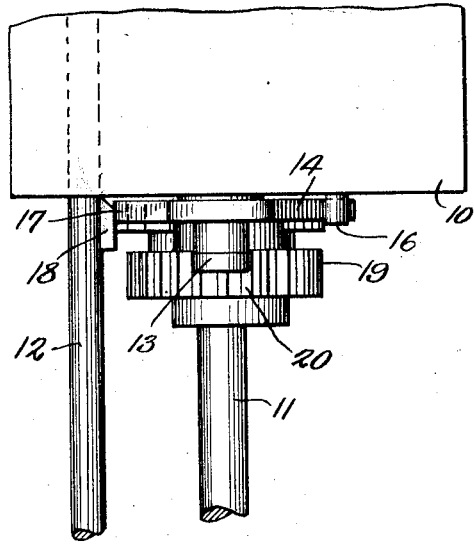
Figure 4 is a top plan view of the invention as applied.

Mounted on a pivot 13 directly above the shaft 11 is a pawl 14 which is arranged to swing into and out of engagement with a ratchet wheel 15 fixed on the shaft 11, the arrangement of the parts being such that, upon the pawl engaging the ratchet, backward rotation of the shaft is prevented. A stop 16 limits movement of the pawl away from the ratchet. Projecting from the pawl in the direction of the rod 12 is an arm 17 which normally rests close to said rod 12. On the rod 12 is a cam lug 18 which, upon the rod being moved to reverse position, engages said arm and moves the pawl to the position shown in Figure 2 so that the purposeful backward rotation of this shaft is not prevented but, unless the rod is in this position the pawl may engage said ratchet as shown in Figure 1. To effect this engagement, and also to cause the pawl to lie free from the ratchet while the shaft 11 is rotating forwardly, there is fixed on the shaft 11 a gear 19 which meshes with a gear 20 revolubly mounted on a stud 21 carried by the ratchet 14. With this arrangement rotation of the shaft 11 as in Figure 1 (backward rotation) causes the pawl to be drawn into engagement with the ratchet but rotation as in Figure 2 effects disengagement of the pawl from the ratchet.

Thus the shaft 11 can only revolve backwardly if the gear shift is arranged for backward movement of the car whereby a car, stopped on a hill in moving upwardly on such hill, cannot back down unless the driver intentionally desires to do so.

There has thus been provided a simple and efficient device of the kind described and for the purpose specified.

It is obvious that changes may be made in the form and construction of the invention without departing from the principles thereof. It is not, therefore, desired to confine the invention to the exact form herein shown and described but it is desired to include all such as come within the scope claimed.

Having thus described the invention, what is claimed is:—

1. The combination with the tail shaft and gear shift reverse rod of an automobile; of a ratchet wheel on said tail shaft, a pawl pivoted adjacent the tail shaft, said pawl and ratchet being arranged to prevent reverse movement of the tail shaft upon engagement of the ratchet with the pawl, means controlled by the gear shift reverse rod for holding said pawl out of engagement upon the operator moving the reverse rod to reversing position, a gear on said shaft, a stud on said pawl, and a second gear revoluble on said stud and meshing with the first gear.

2. The combination with the tail shaft and gear shift reverse rod of an automobile; of a ratchet wheel on said tail shaft, a pawl pivoted adjacent the tail shaft, said pawl and ratchet being arranged to prevent reverse movement of the tail shaft upon engagement of the ratchet with the pawl, a lug on the reverse rod engaging said pawl to hold the same free of the ratchet upon said reverse rod being moved to reversing position, a gear on said shaft, a stud on said pawl, and a second gear revoluble on said stud and meshing with the first gear.

In testimony whereof I affix my signature.

JOSHUA H. JOHNSTON.